United States Patent [19]
Auger et al.

[11] Patent Number: 4,945,312
[45] Date of Patent: Jul. 31, 1990

[54] METHOD AND DEVICE FOR THE DEMODULATION OF SIGNALS WITH CONSTANT ENVELOPE AND CONTINUOUS PHASE ANGLE MODULATION BY A TRAIN OF BINARY SYMBOLS TOLERATING FREQUENCY DRIFTS

[75] Inventors: Gérard Auger, Champagne Sur Oise; Pierre A. Laurent, Bessancourt; Patrick Mocchi, Chatou, all of France

[73] Assignee: Thomson-CSF, Puteaux, France

[21] Appl. No.: 380,537

[22] Filed: Jul. 17, 1989

[30] Foreign Application Priority Data

Jul. 19, 1988 [FR] France .................. 88 09731

[51] Int. Cl.$^5$ .............................................. H03D 3/00
[52] U.S. Cl. .................................. 329/345; 375/100
[58] Field of Search .................. 329/345; 375/78, 80, 375/82, 97, 100; 455/337

[56] References Cited
U.S. PATENT DOCUMENTS

3,938,052 2/1976 Glasson et al. ................. 329/104

*Primary Examiner*—Robert J. Pascal
*Attorney, Agent, or Firm*—Oblon, Spivak, McClelland, Maier & Neustadt

[57] ABSTRACT

The continuous phase angular demodulation method disclosed digitally processes the signal in baseband after having over-sampled it with reference to the bit period. The processing consists in routinely demodulating subsets of differential phases at the bit period $T_b$ shifted with respect to one another by fractions $T_b/q$ of this period, in correcting them, a priori, by the phase deviations associated with a set of pre-defined d frequency drifts and in computing, for the d.q sets thus obtained, a noise criterion. The set of demodulated bits chosen is the one that reduces this noise criterion to the minimum. The set of bits then enables computation of the phase variation emitted and, using this variation and the measured variation, the real frequency drift. Another demodulation taking this drift into account is done for the q sets of initial differential stages and the set minimizing the noise criterion is then chosen and fixes the synchronization bit by the sampling instants associated with it.

8 Claims, 7 Drawing Sheets

FIG_1

FIG_2

FIG_3

FIG_4

FIG_5

FIG_6

FIG_7

METHOD AND DEVICE FOR THE DEMODULATION OF SIGNALS WITH CONSTANT ENVELOPE AND CONTINUOUS PHASE ANGLE MODULATION BY A TRAIN OF BINARY SYMBOLS TOLERATING FREQUENCY DRIFTS

BACKGROUND OF THE INVENTION

1. Field of the Invention

The invention pertains to the demodulation of binary data signals transmitted by angle modulation of a carrier and, more particularly, an object of the invention is a method and a corresponding device for the demodulation of signals with constant envelope and continuous angle phase modulation by a train of binary symbols, that is CPM or continuous phase modulation, tolerating major frequency shifts.

Constant envelope modulations are widely used in radio communications because they are immune to non-linear distortions of amplitude. Continuous phase frequency modulation, wherein the phase variations due to a binary element can be spread over several bit periods, has valuable properties as regards spectral occupancy which is fairly low.

2. Description of the Prior Art

In a standard way, the demodulation is done either in a coherent demodulator, with a phase reference, by a discriminator, or in a non-coherent demodulator which may be of a differential type.

When the transmission channel is a so-called frequency hop type, i.e. when the frequency of the carrier varies by steps, according to a pseudo-random sequence, the steps being of a fixed duration, each step enables the transmission of a number, $n_b$, of bits. Since the modulation applied is a continuous phase angle modulation, the imperfection of the transmission channel, the very high Doppler frequency drifts when the demodulator is on board (for example, in an aircraft), the instability of the oscillators of the reception channel etc., disturb the signal. These different phenomena of degradation result in frequency drifts.

The effect of these frequency drifts on signals with constant envelope and continuous angle phase modulation by a train of binary symbols is to add a continuous component to the useful signals processed. With a fixed threshold demodulation device, the continuous component produces a shift in the so-called "eye" diagram with respect to its nominal level, thus increasing the error rate per bit. A demodulation device, using high-pass filtering, is placed in error by sequences of identical bits, and this situation occurs with high probability in frequency hop links with short steps and, hence, few bits per step. Techniques for demodulation by differential phase or discriminator therefore cannot be applied in the presence of high frequency drifts.

SUMMARY OF THE INVENTION

The method according to the invention consists in performing digital processing operations in baseband, on the phase of the signal over-sampled with respect to the bit period. This method assumes that the step synchronization is achieved and it performs the demodulation of the bits in concomitantly setting up the bit synchronization and the phase estimation, and then the correction of the frequency drifts.

The method (and the corresponding device) for continuous phase angle demodulation according to the invention enables precise demodulation even in the presence of high frequency drifts, with sensitivity performance characteristics of the same order as those obtained when the frequency drift is null, while remaining compatible with frequency hop links, even when each constant frequency step has few bits.

According to the invention, a method for the demodulation of constant envelope and continuous phase signals, consisting in the performing of a digital processing operation in steps of $n_b$ bits, of a received signal brought into to baseband, the phase of which is over-sampled with respect to the bit period $T_b$ consists:

in a first stage, in measuring q subsets of $n_b$ differential phases at the bit period, using starting instants, staggered with respect to one another by fractions $T_b/q$ of this period to form sampling combs at the staggered bit period;

in a second stage, in making a priori corrections of these subsets of differntial phases by phase deviations associated with a set of d predefined frequency drifts to generate d.q sets of $n_b$ corrected differential phases, and in deducing therefrom d.q sets of $n_b$ associated demodulated bits;

in a third stage, reconstructing the differential stages supposed to have been emitted from each of the sets of demodulated $n_d$ bits and in computing, for each of the d.q sets of demodulated bits, a noise criterion taking into account the set of reconstructed differential stages and the set of differential stages measured and corrected as a function of a predefined drift;

in a fourth stage, selecting the set of $n_b$ bits that minimize the noise criterion, the predefined frequency drift that is associated with it corresponding to a rough estimation of the real drift;

in a penultimate stage, computing, on the basis of the selected set of demodulated bits, a fine estimation of the real drift by taking the mean of the differences between the measured differential phases and the reconstructed differential phases associated with this set of $n_b$ bits;

and, in a last stage, performing a demodulation of the q sets of differential stages, after having corrected them by means of the phase deviation associated with the fine estimate of the real drift, in computing, for each, the noise criterion and in selecting, among the sets of resulting bits, that set which minimizes the noise criterion, the sampling comb associated with it forming the synchronization bit.

Another object of the invention is a demodulation device designed to implement this method.

BRIEF DESCRIPTION OF THE DRAWINGS

The invention will be better understood and other characteristics will emerge from the following description, made with reference to the appended drawings, of which.

DESCRIPTION OF PREFERRED EMBODIMENTS

The demodulation method according to the invention is performed as follows, according to the flow chart shown in FIGS. 1 to 3.

The signal received by the receiver is amplified and filtered and then converted to to baseband by conventional means: the phase 0 of the signal received at output of this processing chain is sampled at a frequency $F_e$ at least twice the bit frequency so as to verify the Nyquist criterion, and such that the number of samples q sampled during a bit period $T_b$ is greater, in negative or positive terms, than a fraction k of the bit period $T_b$ corresponding to the permitted bit synchronization error. It is therefore necessary to take samples before the assumed instant of arrival of the first bit of th step and after the assumed instant of the end of the first bit of the sequence of $n_b$ bits of a step, equal in number to $(2E(q/k)+1)$, $E(q/k)$, designating the whole number part of q/k. Thus, after sampling, $(q \cdot n_b + 2E(q/k)+1)$ phase samples of the signal are available.

For each new sample, at a sampling instant nTe, an elementary differential phase $dO_{n-1}$, corresponding to the phase variation of the signal between the sample n taken and the immediately preceding sample n−1, is computed. Thus, there are $q \cdot n_b + 2E(q/k)$ different elementary phases $d\phi_n$ for a step.

With this set of elementary differential stages, sampling combs are constructed as follows:

an original point of the times for each stage is defined by the instant of the first sample $t_1$;

starting from this original instant, the q elementary differential phases $d\phi_1, \ldots d\phi_q$ which follow are added up so as to compute the differential stage $D\phi_1$ corresponding to a phase variation on a one-bit period;

then, from the instant of the second sample $t_2$, another addition is performed for the following q elementary differential phases:

$$D\phi_2 = d\phi_2 + \ldots + d\phi_{q-1} \text{ etc } \ldots$$

$$D\phi_{n-q} = \sum_{i=n-q}^{n-1} d\phi_1,$$

until it is no longer possible to compute differential phases on a one-bit period. Then $q.n_b$ differential phases, each corresponding to a variation in phase on a one-bit period, are available, each of them being identified by the sampling instant $t_1$ corresponding to its origin. The first q of the these differential phases are numbered 1 to q, then the following qs are also numbered q+1 to 2q etc. The differential phases, assigned equal indices modulo q, corresponding to sampling instants spaced out by a bit period, form a "class" of differential phases.

Each of the q classes of $n_b$ differential phases forms a "sampling comb", each corresponding equidistant instants of possible decisions. Each comb is identified by the class 1 to q that it represents.

Figure 4:
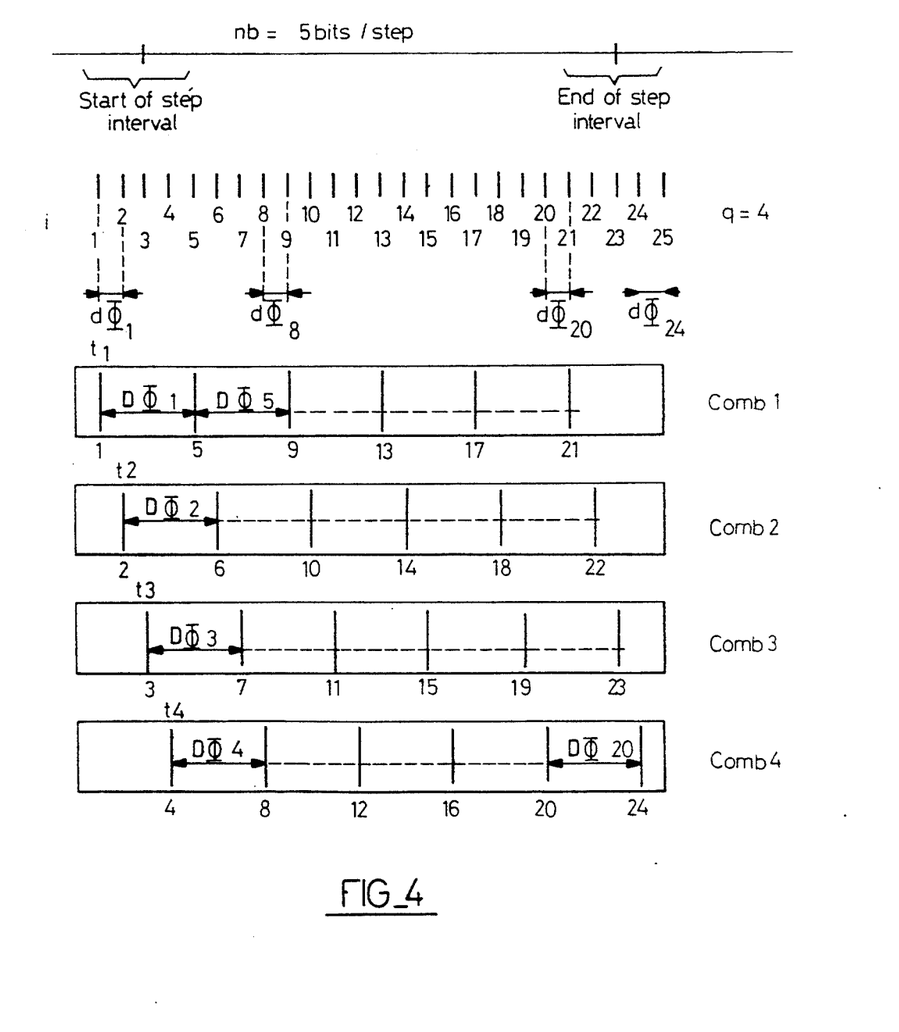
FIG. 4 is a drawing illustrating the sampling of the phase variation of the receive signal, and the formation of the associated sampling combs.

FIG. 4 gives a digital example of the forming of sampling combs. In this example, a step has $n_b = 5$ bits, and the synchronization bit is known at $\pm T_t/2(k=2)$. The sampling period is such that q=4 samples are taken during a bit period. If $T_e$ is the sampling period, the bit period is $T_b = 4T_e$. There is therefore, $(4 \times 5 + 2E(4/2)+1) = 25$ phase samples of the signal on a step. Twenty-four elementary differential stages $d\phi_i$, i=1 to 24 are thus computed and 4 sampling combs, each consisting of 5 differential phases $D\phi_i$, corresponding to the successive phase variations on intervals with a duration equal to the bit period, are created. These sampling combs are shifted with respect to one another by a sampling period. The sampling instants, for a step, and these combs are shown in FIG. 4 with the 4 original instants of the computation of the differential phases that form them.

Figure 1:
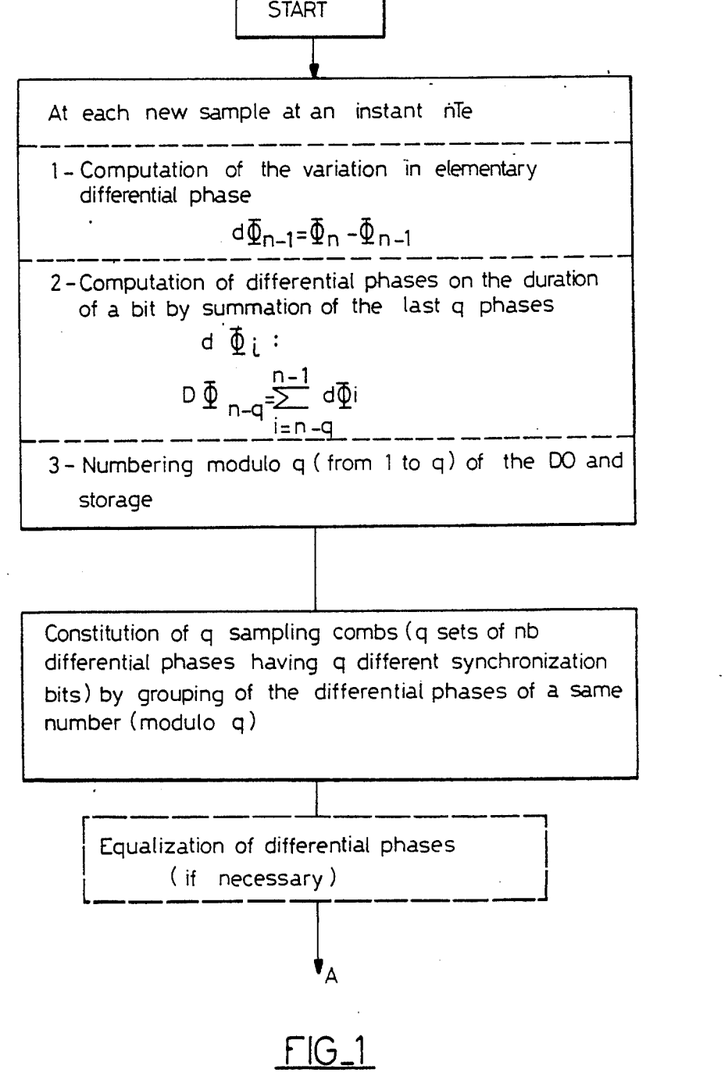
FIGS. 1, 2 and 3 form the flow chart of the demodulation method according to the invention.

In the following step, the $q \cdot n_b$ differential phases thus classified are equalized if necessary (this is why the corresponding box in the flow chart of FIG. 1 is shown with dashes). In effect, certain angle modulations, for example the so-called "partial response" continuous phase frequency modulations, produce phase variations, for the duration of a symbol period, which depend on several bits. The contribution to the phase variation due to this spread over several bits, likened to the inter-symbol interference, should be reduced as far as possible before the demodulation to enable decisions to be taken. This reduction is otained by the "equalizing" operation, which may be interpreted as the search for the symbol that has generated the phase variation.

This equalization is applied only when the differential phase in a symbol period depends on several bits because of the modulation, or for any other cause giving rise to inter-symbol interference, for example, a non-ideal filtration. It shall be described in greater detail below.

Figure 2:
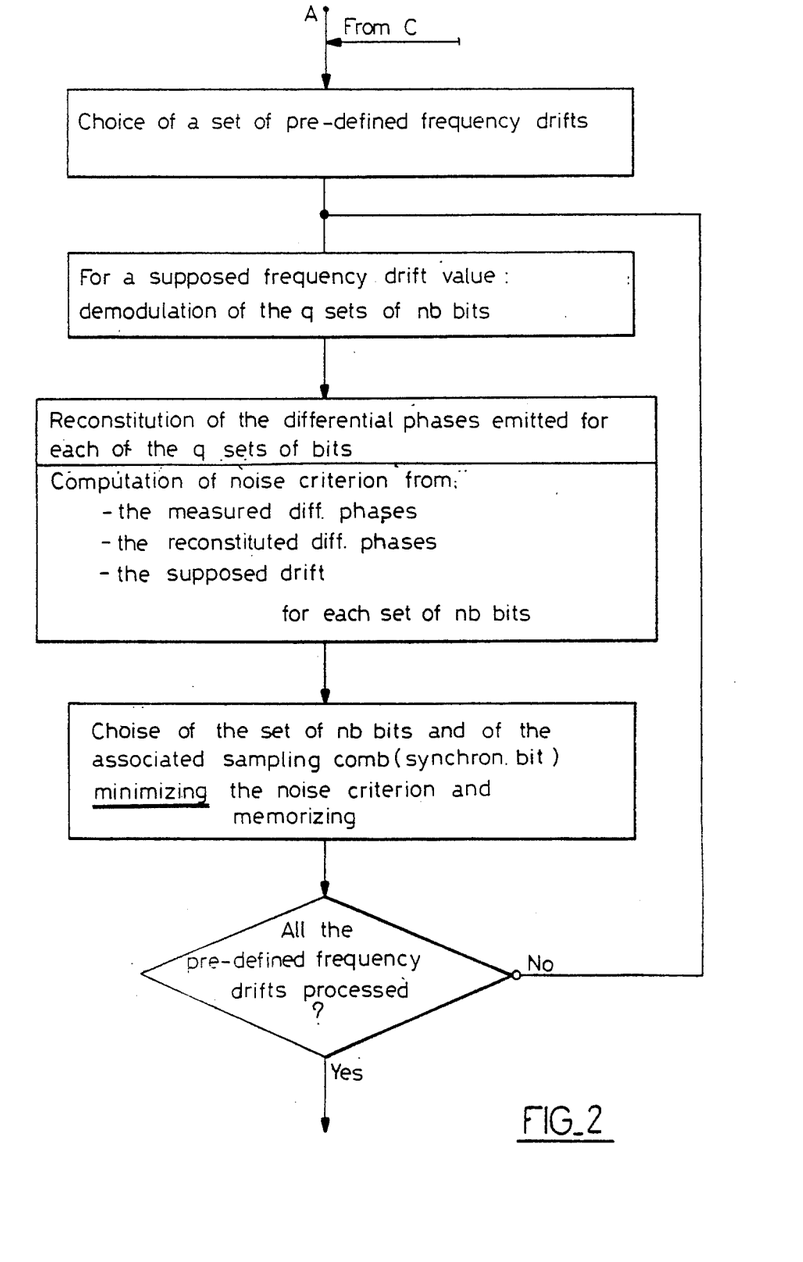
Figure 3:
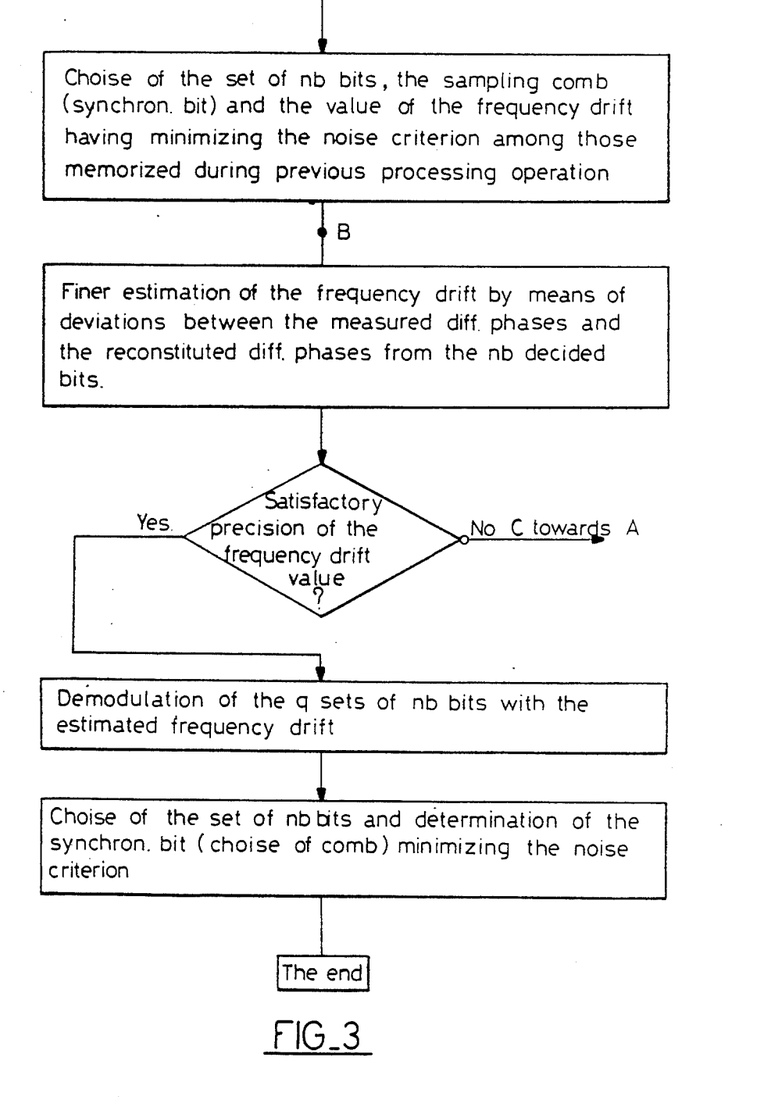

The following step of the demodulation method, illustrated from the point A onwards of the flow chart in FIG. 2, consists in correcting the measured phases in assuming that the frequency drift is equal to one of several pre-defined frequency drifts, distributed to cover the entire possible range of drift. Starting with the evaluation of an expression representing a noise minimizing criterion, the bits supposed to be emitted under the conditions envisaged are demodulated. The values of the pre-defined frequency drifts are chosen, in number, such that the total processing does not take too long but enables a scanning of the most likely possibilities of frequency drifts so as to quickly arrive at an accurate estimate of the real drift. This processing step, described in greater detail below, can be summarized briefly as follows: with a pre-defined frequency drift value being chosen, the equalized differential phases of each of the q sampling combs are reduced by the equalized phase variation corresponding to the frequency drift envisaged. The sign of the resultant differential phases gives the bit assumed to have been emitted. The pre-defined frequency drift values are such that the phase rotation generated by these errors should not produce too many erroneous decisions for the evaluation of the noise power. For, by the coming into play of a pre-defined frequency drift, the equalized differential phase has its sign reversed and the "decision" on the assumed value of the bit is then false.

Thus, at the end of this processing step, there are q sets of $n_b$ bits corresponding to q sampling combs for each pre-defined frequency drift value. Each set of $n_b$ bits can then be used to compute differential phases assumed to be generated at emission, namely to reconstitute the differential phases which are assumed to have been emitted and would correspond to this set of bits, and to assess a "noise criterion" which is a function of the reconstituted differential phases, the measured differential phases and the assumed drift.

The following step then consists in choosing the most appropriate frequency drift and set of samples, by minimizing the assessed noise criterion. This selection can be made, firstly, for each value of drift from among the q possible sets and, then, from among the selected sets associated with the different drift values. A more precise estimate of the frequency drift is then done, in step B, starting from the reconstituted differential phases measured for the set of bits coming from the selection.

Finally, the last step consists in demodulating the q sets of q sets of differential phases (equalized) after correction of these differential phases as a function of the frequency drift estimated more precisely in the preceding phase, and then in collecting the resultant set of $n_b$ bits that minimizes the noise criterion computed above, in associating with it the corresponding sampling comb which simultaneously gives the synchronization bit.

Of course, this latter step cannnot be performed unless the frequency drift is deemed to be estimated with adequate precision. A test designed to verify this is performed as shown in FIG. 3. If the frequency drift has not been estimated with adequate precision, the procedure may be resumed at the step A, starting from a set of pre-defined drifts distributed over a narrower range around the drift estimated at the end of the first processing.

These different steps shall be described in greater detail below, in relation to FIGS. 5 and 6 which represent sub-sets of the demodulation device.

Figure 5:
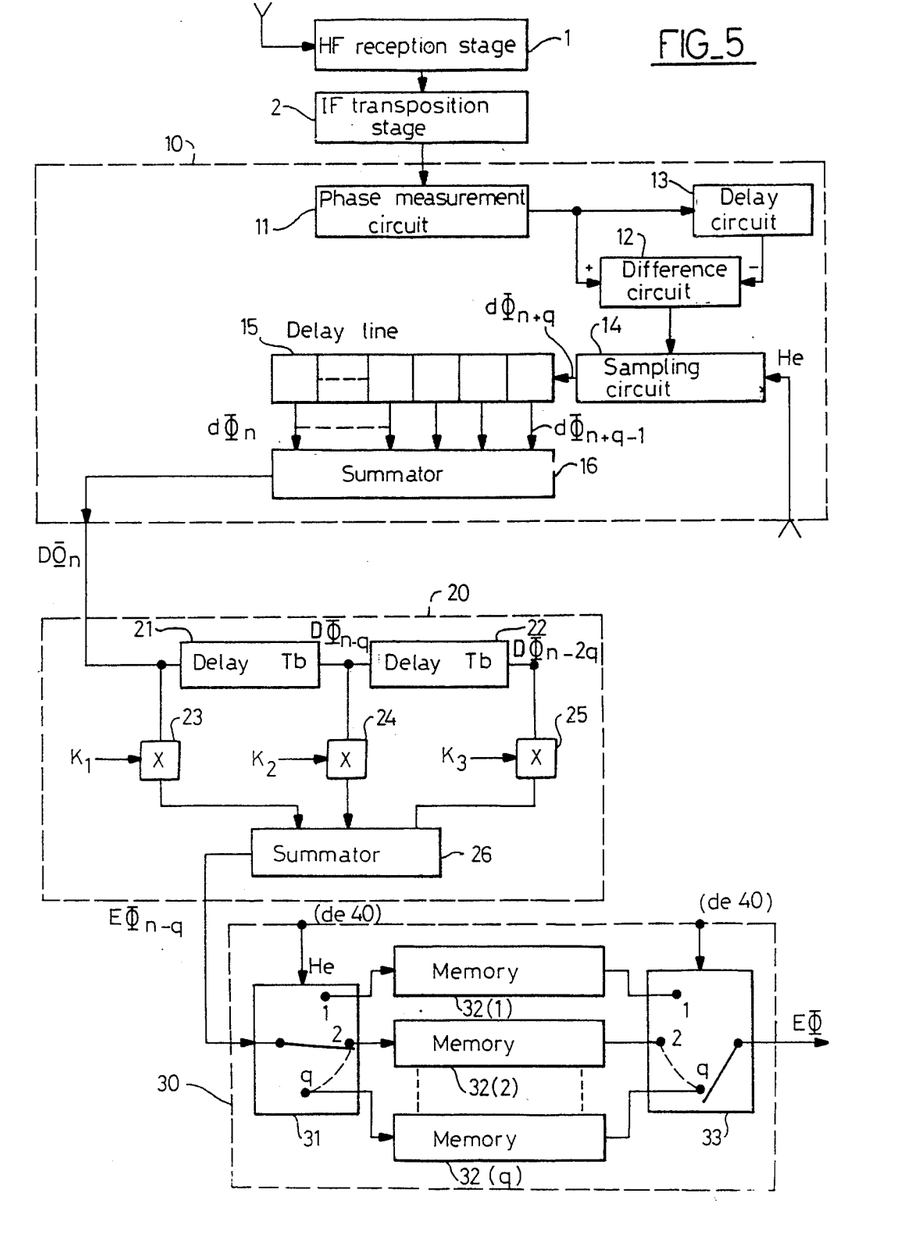
FIGS. 5 and 6 show functional diagrams of two parts of the demodulation device according to the invention.

FIG. 5 shows a first part of the demodulator. The reception chain comprises the HF reception antenna followed by the HF reception stage 1, the amplifier and the filter followed by the stage for transposition into intermediate frequency 2. The signal thus transposed into intermediate frequency is applied to the input of the differential phase generating device 10, which has a phase measuring circuit 11 giving a continuous signal characteristic of the phase of the signal applied to its input. This signal is applied to the inputs of a difference circuit 12, respectively by a direct channel and a channel comprising a delay circuit 13 that imposes a delay equal to the sampling period $T_e = T_b/q$. The output signal of this difference circuit 12 is thus a continuous signal from which it is possible to take the elementary differential phases $d\phi_i$ between separate instants of a sampling period, by means of a sampler 14 controlled by a sampling clock signal $H_e$ coming from a control logic circuit 40 shown in FIG. 6. The elementary differential phases resulting from this sampling are transmitted to the input of a delay line 15 with q stages. The samples stored in this delay line are transmitted, at the sampling period, to summator 16 which computes the successive differential phases $D\phi_n$, corresponding to the phase variations on a 1-bit period, in making a shift, at each computation, by one sample through the coming into play of the shift in the delay line.

If the demodulation used and the filtering at reception generate inter-symbol interferences known a priori as indicated above, an equalization step is implemented. If it is assumed, for example, that three bits of information contribute to a differential phase variation on a one-bit period, and it is assumed that no noise or frequency drift modify this differential phase, it could take the following form:

$$D\phi_n AI_{n-1} + BI_n CI_{n+1}$$

where the $I_k(k=n-1, n, n+1)$ designate the information bits and equal $\pm 1$, A, B and C being constant coefficients. According to the theory of z transforms, the above expression is represented by the polynomial P (z) defined as follows:

$$P(z) = Az^{-1} + B + Cz$$

The equalizer results from the polynomial E(z) which verifies the expression $P(z) \cdot E(z) = 1$ since, by definition, the equalization corresponds to the search for the reverse of the polynomial P. This polynomial is not causal and, therefore, cannot be achieved physically, but it may be approximated as follows:

$$E(z) = -\alpha z^{-1} + 1 - Bz;$$

$\alpha$ and $\beta$ are two constants determined on the basis of the coefficients A, B and C in cancelling the terms in $z^{-1} \cdot z$ of the polynomial $P(z) \cdot E(z)$. Thus, the unwanted terms are at least second order terms in z and $z^{-1}$. These equalization techniques are known, and it is therefore assumed in the rest of the description that the coefficients $\alpha$ and $\beta$ of the equalizer have been computed beforehand. (If more than three bits generate the phase variation expressed above and if it is sought to equalize at a higher order than the second order in adding the desired power values to the term in $z^{-1}z$, it is necessary to compute a greater number of coefficients).

For the equalization, the demodulator shown in FIG. 5 has an equalizing device 20 corresponding to a modulation wherein the variation in phase on a one-bit period is spread out over three bits of information. This equalization device 20 has two delay lines with a duration equal to one bit, 21 and 22 in series. The input of the delay line 21 is connected to a first input of a multiplier 23, the second input of which receives a piece of information pertaining to a multiplication coefficient $K_1$. Similarly, the outputs of the delay lines 21 and 22 are respectively connected to the inputs of two multipliers 24 and 25, the other inputs of which respectively receive multiplier coefficients $K_2$ and $K_3$. Coefficients $K_1$, $K_2$ and $K_3$ are directly linked to the coefficients $-\alpha$, $+1$ and $-\beta$ of the equalizing polynomial E(z). The output of these three multipliers are connected to the input of a summator 26 which thus gives a differential phase called an "equalized" phase, $E\phi$, related in principle only to the value of the bit of information of a corresponding order. The output of this summator is the output of the equalization device. Of course, the equalization cannot be achieved properly unless the phase variations are sufficiently known and unless they modelized linearly with respect of the bits of information that generate this equalization.

A routing system 30 enables the creation of the above-defined "combs" using differential phase values equalized at the output of the equalizing device, these equalized values being emitted at the rate of the samples. This routing device has a first cyclical changeover switch 31 with q positions, working at the rate of the sampling clock signal $H_e$. The change-over switch 31 enables all the equalized differential phases assigned the same number modulo q to be routed towards one of the q memories 32(1), 32(2) . . . 32(q). The outputs of these q memories are connected to corresponding inputs of a routing device 33 with q inputs and one output which is controlled at the rate of the bit clock signal $H_b$ obtained by frequency division by q of the sampling clock signal $H_e$ in the control circuit 40 (FIG. 6). This routing device 33 enables the equalized differential stages $E\phi$, stored in one of the q memories, to be transferred into one of the q memories by packets of $n_b$, and enables them to be processed as shall be explained further below.

Figure 6:
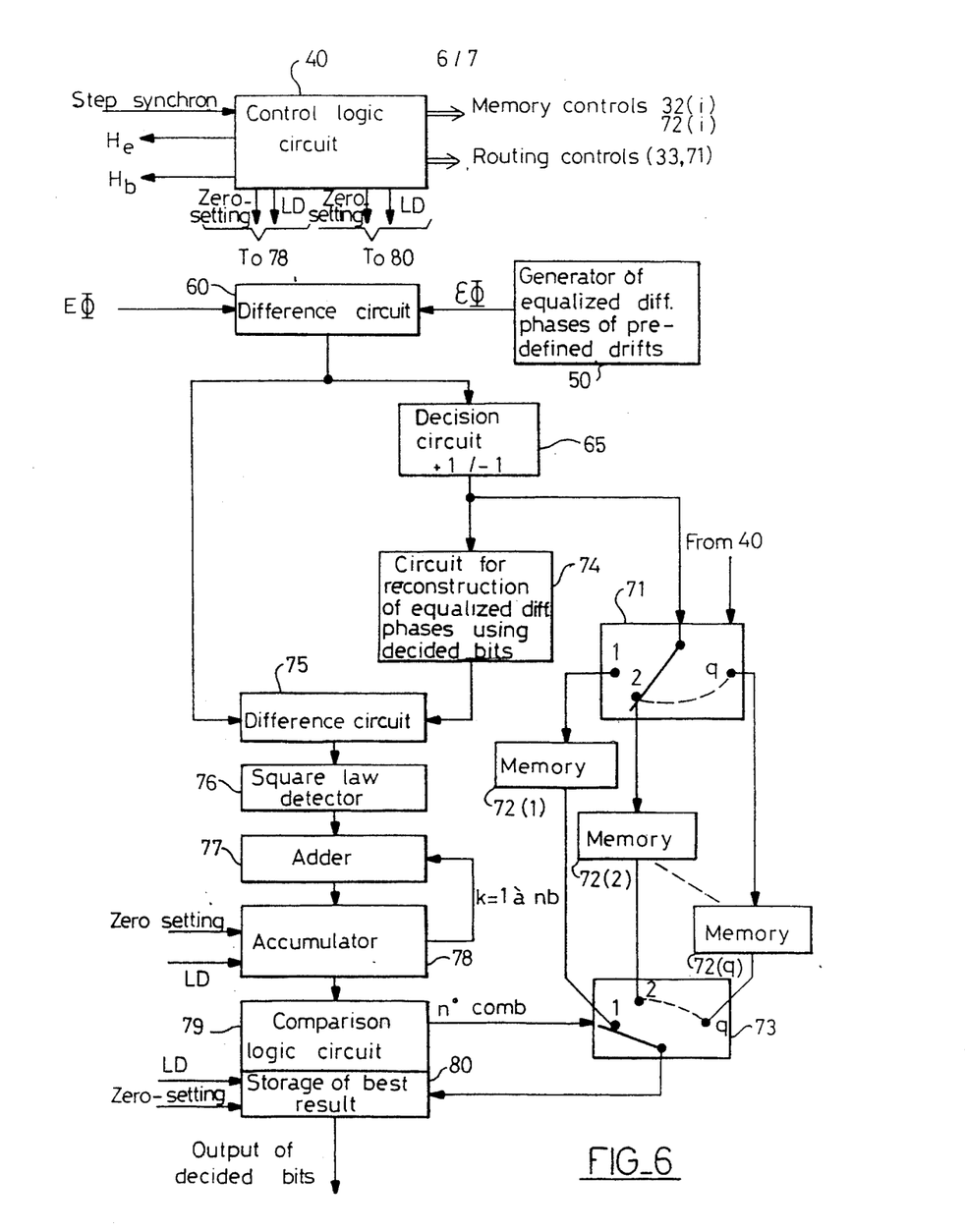

The device made after the processing is shown in FIG. 6: it has the logic control circuit 40 which controls the the zero setting, the writing and reading of the memories, the selection of frequency drift values, and the change-over switches. To simplify the figure, the corresponding control wires have not been shown. They also have a generator of equalized differential phases associated with the pre-defined frequency drifts 50, a difference circuit 60, a first input of which is connected to the output of the routing device 33 and the other input of which is connected to the output of said generator of differential phases associated with the pre-defined frequency drifts 50. This generator 50 generates the differential phases collected for each pre-defined frequency drift value.

The output of the circuit 60 is connected to a $+1/-1$ decision circuit 65, which, using each corrected differential phase value, decides on the value of the corresponding bit assumed to be emitted. The sequences of corresponding decided bits are then stored in one of q memories 72(1), 72(2) . . . 72(q) through a cyclical change-over switch 71 with q positions, the outputs of these memories being connected to the inputs of a routing device 73 with q inputs and one input.

These same sequences of decided bits are transmitted to a circuit 74 for the reconstitution of the differential equalized phases, assumed to be emitted, given the decided bits. These differential phase values are then transmitted to a difference circuit 75 which compares them to the corresponding values measured, after equalization, available at the output of the difference circuit 60.

It is then possible to assess, for each set of $n_b$ bits, the mean of the mean square deviations between the measured and equalized differential phases and the equalized differential phases reconstructed from the $n_b$ corresponding bit and the pre-defined frequency drift. In fact, this amounts to assessing the mean square deviation of the "noise" affecting the sequence of $n_b$ bits, if no error is committed during the assessment of the differential stages emitted. The following is the expression of the mean of the mean square deviation, which is the "noise" criterion:

$$C = \frac{1}{n_b} \sum_{k=1}^{n_b} [(E\phi_k)_m - (E\phi_k)_r - \epsilon\phi]^2$$

where $(E\phi_k)_m$ is the equalized differential phase measured (available at the output of the circuit 30), $(E\phi_k)_r$ is the equalized differential phase reconstructed from the set of selected bits (available at output of the reconstruction circuit 74) and $E\phi$ is the equalized differential phase due to the frequency drift (available at the output of the generator 50).

For an order k bit in a sequence of $n_b$ bits, with k included between 1 and $n_b$, the difference circuit 75 computes the difference: $(E\phi_k)_m - (E\phi_k)_r - EO$, and a square law detector 76 computes its square. This square law detector is followed by an adder 77, which adds these values to the preceding value transmitted to an accumulator 78 and re-applied to the adder 77 so as to compute the noise criterion corresponding to a sequence of $n_b$ decided bits. The output of this accumulator is connected to a logic comparison circuit 79 associated with a memory 80 for the storage of the best result. For each sequence of decided bits, this comparison circuit 79 compares the computed noise criterion with the previously stored noise criterion and stores it in its place if it is smaller.

To assess this criterion, and throughout the method, it is assumed that the drift is constant for the duration of a step. The decision process is thus the following: only the set of $n_b$ bits for which the criterion is minimum as well as the identification number of the corresponding sampling comb are chosen. This choice of one set of $n_b$ bits and of the corresponding sampling comb is done as many times as there are pre-defined frequency drift values, namely, d times.

The criterion of the minimum of the mean square deviation, which was used to select one of all the sets of bits and of the associated sampling combs for one and the same re-defined frequency drift value, is again applied to the pairs (sets of $n_b$ bits, number of sampling combs) which were previously selected and which correspond each to a pre-defined frequency drift value. At the end of this processing, only one set of $n_b$ bits remains and only one sampling comb, associated with a pre-defined frequency drift value.

The set of $n_b$ bits thus chosen is the sequence of $n_b$ bits, assumed to have been emitted, available at the "decided bits" output.

The preserved sampling comb forms the synchronization bit, each of the instants forming this comb proving to be the best precision instant.

The pre-defined frequency value chosen proves to be a rough estimate of the frequency drift.

As indicated above, in taking a mean of the $n_b$ differences between the measured and equalized "received" differential phases, namely $(E\phi_k)_m$, and the reconstructed equalized differential phases, namely, $(E\phi_k)_r$ using the set of $n_b$ decided, we obtain a fine estimation of the "real" frequency drift. Depending on the precision required for the demodulator, this estimate may be sufficient. If not, as indicated above, the above-explained processing operations explained may be repeated until the desired precision is obtained, by applying them to one or more sets of frequency drift values, distributed around the "rough" estimate of the drift defined in the preceding stage. However, it must be noted that the method converges rapidly and that, quite often, only one processing operation of this type leads to adequate precision on the value of the frequency drift.

Finally, when the frequency drift is estimated with adequate precision, the processing operations performed above for a pre-defined drift value, are repeated with this "fine value" to finally give the $n_b$ decided bits and the corresponding synchronization bit.

The assessment of the performance characteristics of this demodulation method was done by measuring the error rate per bit as a function of the signal-to-noise ratio $E_b/n_0$, $E_b$ designating the energy per bit, and $N_O$ the noise density.

Figure 7:
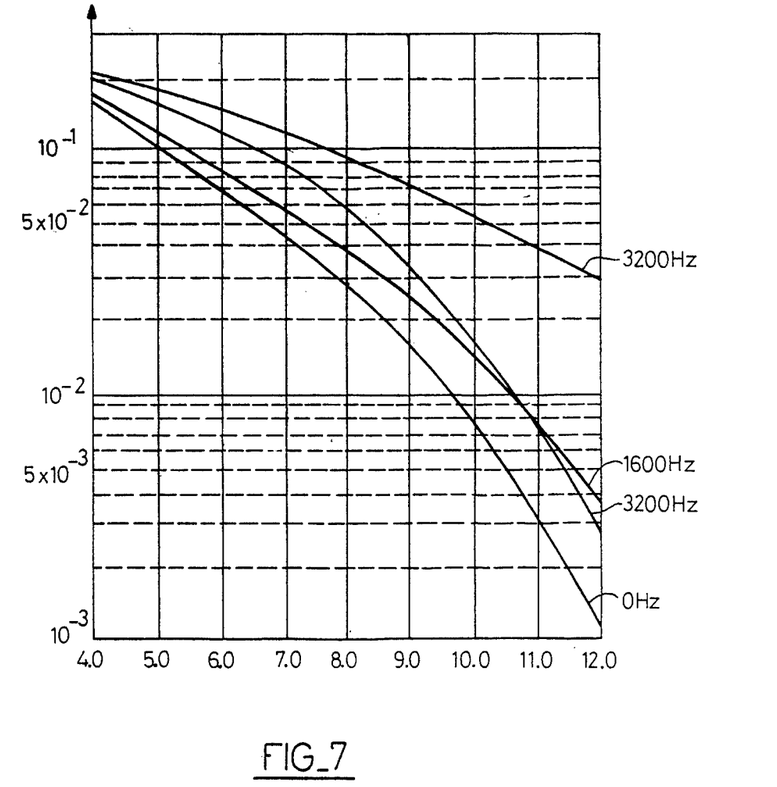
FIG. 7 shows curves of variation of the error rate as a function of the signal-to-noise ratio for different values of frequency drifts and depending on whether or not the method according to the invention is used.

FIG. 7 shows the error rate curves as a function of this ratio for different uncorrected values of frequency drifts 0, 1600 Hz, 3200 Hz, obtained by a standard demodulation method in the case of a demodulation SRC4, characterized by a modulation speed of 36K bits per second and for a frequency hop link comprising 18 bits per step. The same figure also shows the curve obtained by the demodulation method according to the invention, with the previously considered maximum frequency error, that is 3200 Hz. It appears that the demodulation method proposed leads to degraded performances solely of the order of 1 dB when there are great frequency drifts as compared with the performance tatings obtained in an ideal case when there is no frequency drift.

The invention is not restricted to the embodiments described and represented herein. In particular, we have described the entire method and demodulation device taking into account an equalization needed only for inter-symbol interference. Naturally, if the phase variation due to a bit is not spread, this equalization is not necessary, and the values of pre-defined frequency drifts imply phase variations which may be deduced directly from the measured differential phases, naturally without equalization.

Furthermore, to give an explicit idea of the demodulator, the representation made of it shows functional blocks. Of course, all the corresponding functions could be processed by means of a microprocessor.

What is claimed is:

1. A method for the demodulation of constant envelope and continuous phase signals having a bit period $T_b$, consisting in the performing of a digital processing operation for successive groups of $n_b$ bits, of a received signal brought into baseband, the phase of which is over-sampled with respect to the bit period $T_b$, consisting:

in a first stage, in measuring q subsets of $n_b$ differential phases at the bit period, using starting instants, staggered with respect to one another by fractions $T_b/q$ of this period to form staggered sampling combs at the bit period;

in a second stage, in making d a priori corrections of each of said q subsets of differential phases by phase deviations associated with a set of d pre-defined frequency drifts, to generate d times q subsets of $n_b$ corrected differential phases, and deducing therefrom d times q sets of $n_b$ associated demodulated bits, each corresponding to a measured subset of differential phases associated with one of said d pre-defined drifts;

in a third stage, reconstructing the differential phases supposed to have been emitted from each of the sets of $n_b$ demodulated bits, and in computing, for each of the d times q sets of demodulated bits, a noise criterion taking into account the subset of reconstructed differential phases and the associated subset of corrected differential phases measured and corrected as a function of a predefined drift;

in a fourth stage, selecting the set of $n_b$ bits that minimizes the noise criterion, the predefined frequency drift that is associated with said selected set of $n_b$ bits corresponding to a rough estimation of the real drift;

in a penultimate stage, computing, on the basis of the selected set of demodulated bits, a fine estimation of the real drift by calculating mean of differences between the measured differential phases and the reconstructed differential phases associated with this set of $n_b$ bits, and then a final phase deviation associated with said fine estimation of the real drift;

and, in a last stage, performing a demodulation of the q subsets of measured differential phases, after having corrected them by the final phase deviation associated with the fine estimate of the real drift, in computing, for each, the noise criterion and in selecting, among the sets of resulting bits, that set which minimizes the noise criterion, the sampling comb associated with it forming the synchronization bit.

2. A method according to claim 1, wherein during modulation phase variation due to a bit is spread out over several bit periods of the emitted signal, the measured differential phases being equalized in the first stage to reduce the spread effect, all the phase deviations associated with the pre-defined frequency drifts, and then the reconstructed differential phases determined during the third stage, being equalized in the same way.

3. A method according to claim 1 wherein, for the measuring of the q subsets of $n_b$ measured differential phases at the bit period, the method consists in sampling the signal in baseband at the period $T_b/q$, measuring the variations in elementary differential phases between successive samples and adding $n_b$ times q successive elementary differential phases using a first starting sample to form a first subset of $n_b$ differential phases, successive subsets of measured differential phases being obtained in the same way from successive starting samples staggered one another by $T_b/q$.

4. A method according to claim 1, wherein the d pre-defined frequency drifts are distributed in the possible frequency drift range.

5. A method according to claim 4 wherein, at the end of the fourth stage, a test is made on precision of the rough estimation of the real drift, and wherein, if precision is insufficient, the method is resumed at its second stage starting from another set of predefined frequency drifts distributed around the previously selected rough estimation.

6. A method according to claim 1 wherein, for a set of demodulated bits taking into account one of said d frequency drifts, the noise criterion is the mean of the mean square deviations between the measured differential phases corrected by the phase deviation associated with this frequency drift and the corresponding reconstructed differential phases.

7. A demodulation device designed for the implementation of the method according to claim 1 comprising, controlled by a control circuit 40:

a circuit for the measurement of q subsets of $n_b$ differential phases using a signal characteristic of the phase of received signal to be demodulated, sampled at the period $T_b/q$, a circuit for equalization of the differential phases, performing a linear combination of successive differential phases, if need be, to reduce the effect of spread when it exists, a routing and memorizing circuit to form subsets of measured and equalized differential phases corresponding to sampling combs shifted by bit period fractions having outputs;

a generator of equalized differential phases associated with all the pre-defined frequency drifts having outputs;

a difference circuit having inputs connected to the outputs of the routing and memorizing circuit and to the outputs of the generator having an output;

a circuit for decision on the value of the bits having an output connected, firstly, to a demodulated bits routing and memorizing circuit and, secondly, to a circuit for the reconstruction of phases assumed to be emitted as a function of these bits having respective outputs;

a circuit for the computation of a noise criterion connected to the output of the difference circuit and to the output of the circuit for the reconstruction of phases assumed to be emitted;

and a comparison circuit with memory to select that set of bits, among the memorized bits, which minimizes the noise criterion.

8. A demodulation device according to claim 7, wherein the control, computation, memorizing, decision and selection functions are implemented in a microprocessor that processes the digital values of differential phases.

* * * * *